United States Patent
Singh et al.

(10) Patent No.: US 11,266,923 B2
(45) Date of Patent: Mar. 8, 2022

(54) FLUID DISTRIBUTION DEVICES

(71) Applicant: Technip Process Technology, Inc., Houston, TX (US)

(72) Inventors: Raj Kanwar Singh, Katy, TX (US); Paul Marchant, Katy, TX (US); Dilip Dharia, Sugarland, TX (US)

(73) Assignee: Technip Process Technology, Inc., Houston, TX (US)

( * ) Notice: Subject to any disclaimer, the term of this patent is extended or adjusted under 35 U.S.C. 154(b) by 0 days.

(21) Appl. No.: 16/393,875

(22) Filed: Apr. 24, 2019

(65) Prior Publication Data
US 2020/0338469 A1    Oct. 29, 2020

(51) Int. Cl.
| | | |
|---|---|---|
| *B01D 3/00* | (2006.01) | |
| *B01J 8/00* | (2006.01) | |
| *B01J 8/18* | (2006.01) | |
| *B01J 8/24* | (2006.01) | |
| *B01J 19/00* | (2006.01) | |
| *B01J 19/26* | (2006.01) | |
| *B05B 1/34* | (2006.01) | |

(52) U.S. Cl.
CPC ............... *B01D 3/008* (2013.01); *B01J 8/24* (2013.01); *B01J 19/26* (2013.01); *B05B 1/34* (2013.01); *B01J 2208/0084* (2013.01)

(58) Field of Classification Search
CPC .... B01D 3/00; B01D 3/008; B01J 8/00; B01J 8/18; B01J 8/24; B01J 19/00; B01J 19/26; B01J 2208/00; B01J 2208/00796; B01J 2208/00823; B01J 2208/00831; B01J 2208/0084; B05B 1/00; B05B 1/34
See application file for complete search history.

(56) References Cited

U.S. PATENT DOCUMENTS

| | | |
|---|---|---|
| 5,571,482 A | 11/1996 | Long et al. |
| 8,349,753 B2 | 1/2013 | Santner et al. |
| (Continued) | | |

FOREIGN PATENT DOCUMENTS

| | | |
|---|---|---|
| CN | 201154303 Y | 11/2008 |
| FR | 3065886 A1 | 11/2018 |

OTHER PUBLICATIONS

International Search Report and Written Opinion issued in corresponding PCT application No. PCT/US2020/029661, dated Jul. 28, 2020.

*Primary Examiner* — Natasha E Young
(74) *Attorney, Agent, or Firm* — Locke Lord LLP; Alan B. Clement; Alicia J. Carroll

(57) ABSTRACT

A fluid distribution device includes a riser having a first end and a second end. A cap operatively connected to the second end of the riser. The cap includes an inner surface and an outer surface with a plurality of holes defined between the inner and outer surface. The device includes at least one distribution arm extending radially outward from the cap. The at least one distribution arm has an interior surface and an exterior surface. The at least one distribution arm includes a plurality of holes between the interior surface and the exterior surface. A processing assembly includes a vessel defining an interior space and the fluid distribution device including a riser mounted in the interior space of the vessel having a first end mounted to the vessel and a second end opposite from the first end.

20 Claims, 8 Drawing Sheets
(1 of 8 Drawing Sheet(s) Filed in Color)

(56) References Cited

U.S. PATENT DOCUMENTS

| | | |
|---|---|---|
| 9,410,750 B1 | 8/2016 | Kurukchi et al. |
| 9,677,830 B2 | 6/2017 | Kurukchi et al. |
| 9,833,759 B2 | 12/2017 | Le Coz et al. |
| 2011/0200459 A1 | 8/2011 | Santner et al. |
| 2014/0360919 A1 | 12/2014 | Le Coz |
| 2016/0216051 A1 | 7/2016 | Kurukchi et al. |
| 2016/0313077 A1 | 10/2016 | Kurukchi et al. |
| 2018/0320891 A1* | 11/2018 | Panchai ............... C10G 11/182 |
| 2020/0147575 A1* | 5/2020 | Tebianian ............. B01J 8/1827 |

* cited by examiner

FLUID DISTRIBUTION DEVICES

BACKGROUND

1. Field

The embodiments disclosed herein relate to fluid distribution device, more particularly to distribution devices used in fluid catalytic cracking process used in the refining industry.

2. Description of Related Art

Fluid catalytic cracking (FCC) processes are widely used for the conversion of hydrocarbon feed streams such as vacuum gas oils and other relatively heavy oils into lighter and more valuable hydrocarbon products. In the FCC process finely divided catalyst particulates are used to crack the feed oil producing light olefins, gasoline, diesel and other products. The catalyst particulates are maintained in a fluidized state using gas or vapors as a fluidizing media allowing the catalyst to move between the reaction and regeneration zones. In FCC configurations, risers or lift lines, are used to carry gas catalyst reactions while transporting the catalyst vertically upwards, at the riser top is a device to distribute the gas and catalyst into a bed of fluidized catalyst particles. The distributors are used to disperse the gas and particulates from the riser into the bed of fluidized catalyst. There are many distributor designs, but so called mushroom cap distributors offer many advantages and are used in both reactor and regenerator vessels. These distributors are also known as Riser Termination Devices (RTDs).

In Deep Catalytic Cracking processes, which is one kind of FCC process, a mushroom-style distributor is used as a riser termination device. This distributor is placed at top of the riser to distribute hydrocarbon vapor and partially coked catalyst from the riser into the fluidized catalyst bed in the reactor vessel. Distribution of hydrocarbon vapor into the fluidized catalyst bed is important in order to provide sufficient residence time for the vapors to further crack in the fluidized catalyst bed. In general, such catalyst bed cracking designs are used to further crack the riser naphtha into propylene rich olefin streams. Any mal-distribution or channeling of vapor can lead to poor yields, such as low product olefinicity, high dry gas, etc.

In the FCC single stage regenerator application, mushroom type distributors are generally used at the lift line top to uniformly distribute both air and spent catalyst into a regenerator catalyst bed. In two-stage regenerators, where a second stage regenerator is stacked on top of a first stage regenerator, a traditional mushroom distributor is located in the second stage regenerator on top of the spent catalyst lift line from the first stage regenerator. The lift air and catalyst flows up the lift line, collects momentarily under the mushroom cap and is distributed through the holes/orifices located at the top of the mushroom and also through the notches located along the bottom skirt of the mushroom. The performance of the distributor assists in achieving uniform regeneration of catalyst as well as uniform temperature profile in the regenerator vessel. Mal-distribution or channeling of air and spent catalyst can lead to temperature variation as well as after burn in the regenerator, which limits the operating flexibility of the vessel.

Prior art devices have tried to address distribution problems. Prior art distributor devices include those described in U.S. Pat. No. 5,571,482, which discloses a mushroom cap distributor with orifices in the cap and weir fashion notches at the rim of the cap to insure good distribution of the catalyst and lift media in the dense fluidized catalyst bed. U.S. Pat. No. 9,833,759 describes another version of a fluid distribution device comprising a cap with at least one deflection means disposed on its outer surface configured to direct or maintain the gas towards or at the periphery of said cap.

A structure in accordance with one kind of a traditional mushroom distribution device 10 is shown in FIGS. 1A and 1B. In both FIGS. 1A and 1B, a mushroom cap 12 has discrete holes 14, e.g. orifices, on top and weir notches 16 at a rim of the cap 12 to insure good distribution of vapor and catalyst into the dense fluidized catalyst bed. In FIG. 1A, the weir notches 16 are rectangular and in FIG. 1B, they are triangular. A riser top 17 generally has multiple slots 18 through which fluid mixture of vapor and catalyst from the riser or lift line flows out of it. The fluid distribution through and around the mushroom distribution device 10 depends on the number of holes/orifices 14 on the mushroom cap 12. The number of holes 14 are generally set based on desired flow distribution by balancing the pressure drop across the orifices and around the cap. The flow through the discrete holes 14 on the mushroom cap 12 promotes small bubble formation and increases gas solid contacting above the mushroom cap 12.

Traditional distribution devices, like those of FIGS. 1A and 1B, only span a limited area of the total reactor cross-sectional flow area. Flow distribution per vessel area can never be consistent in the reactor application where majority of gas flows through the riser, unless the whole cross-sectional flow area is covered by the cap, which is not practical for a reactor stacked on top of the stripper with catalyst flowing down from reactor to stripper vessel. Additionally, flow around a skirt 19 of the cap 12 has the tendency to coalesce with the gas flowing through the holes and can potentially cause gas streaming and channeling.

During intended operation, a portion of the gas flows through the orifices in the form of small bubbles and the rest of the gas portion flows around the cap through the side notches. The intent of the gas flowing around the cap is to have it distributed in the vessel area around the cap and fluidize it evenly. However, gas flowing around the cap has the tendency to flow along the cap wall, sweep along the top surface, combine with gas bubbles from the holes and form a center plume of high velocity fluid and largely bypassing the bed without interacting with the fluidized catalyst bed.

Such conventional methods and systems have generally been considered satisfactory for their intended purpose. However, there is still a need in the art for improved mushroom style distributors. Additional objects of the embodiments of the present disclosure will become apparent from the following summary and detailed discussion.

SUMMARY

A fluid distribution device includes a riser having a first end and a second end. A cap operatively connected to the second end of the riser. The cap includes an inner surface and an outer surface with a plurality of holes defined between the inner and outer surface. The device includes at least one distribution arm extending radially outward from the cap. The at least one distribution arm has an interior surface and an exterior surface. The at least one distribution arm includes a plurality of holes between the interior surface and the exterior surface.

In accordance with some embodiments, the cap includes at least one inwardly extending opening. The at least one distribution arm can be nested within the at least one inwardly extending opening. The cap can terminate in a downwardly extending skirt having an edge facing toward the first end of the riser. The at least one distribution arm can extend radially outward beyond an edge of the cap. The at least one distribution arm can include a plurality of distribution arms evenly spaced apart about a center of the cap. The outer surface of the cap can define an apex. A longitudinal axis of a top surface of at least one of the distributor arms is positioned at the vertical elevation of the apex. The apex can define a tangential plane. The longitudinal axis of the top surface of at least one of the distributor arms can be parallel to the tangential plane.

In some embodiments, each of the distribution arms is equally spaced apart from adjacent distribution arms. The at least one distribution arm can define a distribution arm flow path from an inner surface side of the cap through an interior cavity of the distribution arm and out through at least one of the plurality of holes of the distribution arm. The at least one distribution arm can be bounded by a respective top wall and two respective side walls. The plurality of holes of the at least one distribution arm can be defined in the respective top wall. The top and side walls of the at least one distribution arm can be mounted to the cap. The least one distribution arm can be at least partially enclosed by a bottom wall connecting between the two side walls. The least one distribution arm can be open between the two side walls opposite from the top wall. The top and side walls of the at least one distribution arm can be integrally formed. The exterior surface of the distribution arm has an arcuate shape. The outer surface of the cap can be dome shaped. The cap terminates in a downwardly extending skirt having an edge facing toward the first end of the riser. The downwardly extending skirt can include a plurality of weir notches extending upwardly into the skirt from the edge of the skirt. The first end and the second end of the riser can be a first inlet end and a second inlet end. The cap can be operatively connected to the outlet end of the riser.

In accordance with another aspect, a processing assembly includes a vessel defining an interior space and a fluid distribution device including a riser mounted in the interior space of the vessel having a first end mounted to the vessel and a second end opposite from the first end. The device includes a cap operatively connected to the second end of the riser. The cap includes an outer surface and an inner surface with a plurality of holes defined between the inner and outer surface. The device includes at least one distribution arm extending radially outward from the cap. The at least one distribution arm defines an interior surface and an exterior surface. The at least one distribution arm includes a plurality of holes between the interior surface and the exterior surface.

In some embodiments, the at least one distribution arm extends radially outward from the cap toward an interior surface of the vessel. The processing assembly can be a fluidized catalyst bed reactor. The processing assembly can be a fluidized bed regenerator. The vessel can include an opening for receiving the first end of the riser. The cap can terminate in a downwardly extending skirt having an edge facing toward the first end of the riser. A top surface of the at least one distribution arm can define a respective central longitudinal axis, similar to the longitudinal axis described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

There are thirteen figures attached to the present specification, which figures are as follows. Additionally, the patent application file contains at least one drawing executed in color. Copies of this patent or patent application publication with color drawings will be provided by the Office upon request and payment of the necessary fee.

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1A:
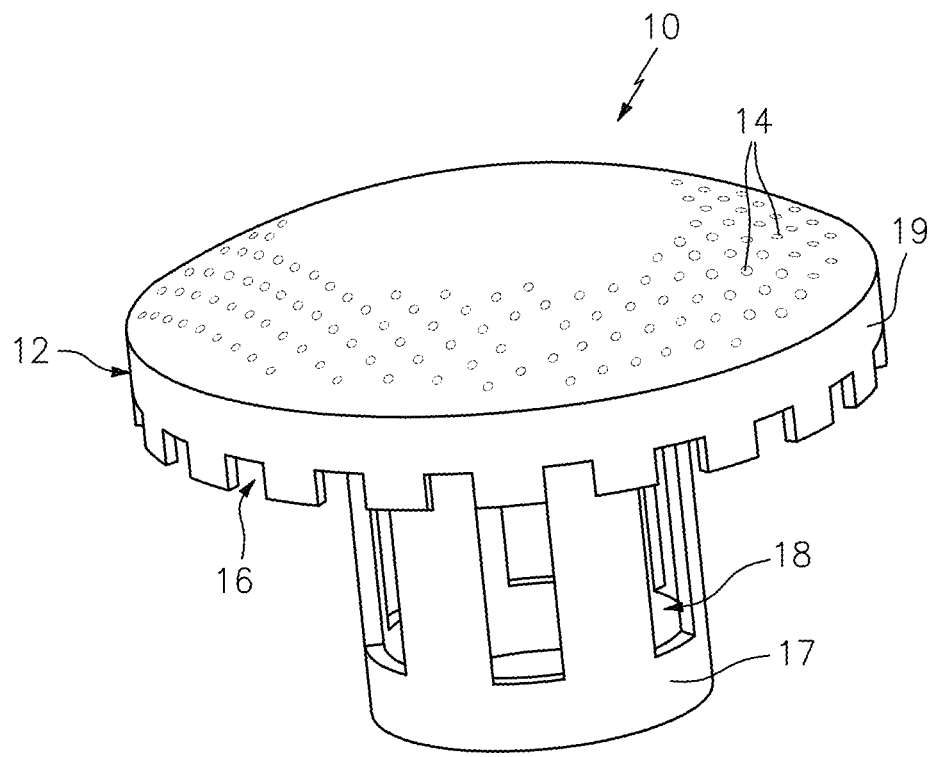
FIGS. 1A-1B show a traditional distribution device.
Figure 1B:
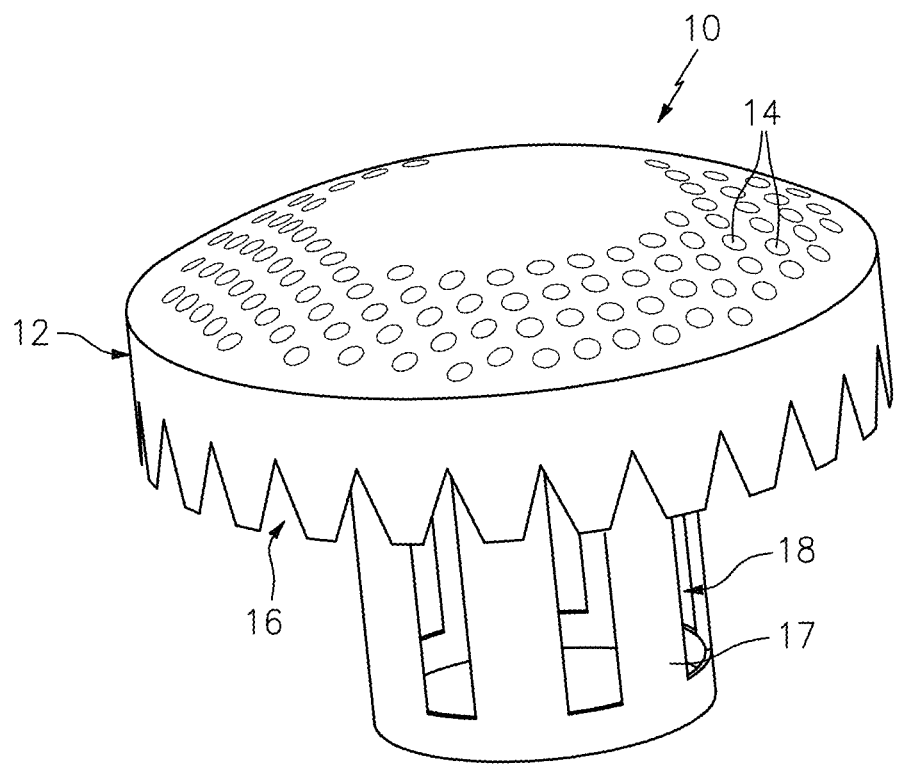
Figure 2:
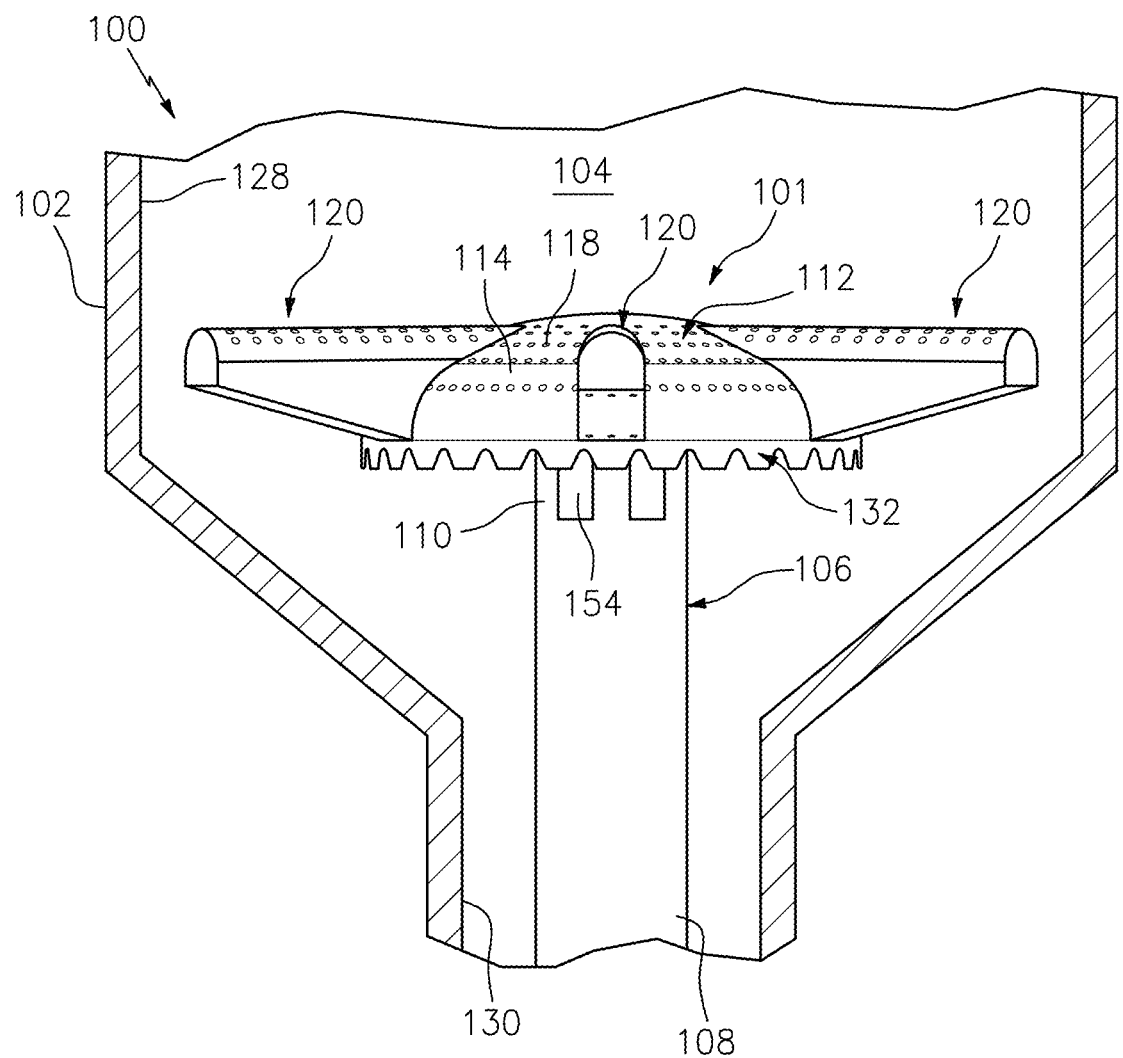
FIG. 2 is a schematic representation of a reactor assembly having an embodiment of a distribution device constructed in accordance with the present disclosure that includes distribution arms.

Reference will now be made to the drawings wherein like reference numerals identify similar structural features or aspects of embodiments of the subject invention. For purposes of explanation and illustration, and not limitation, a schematic representation of an exemplary embodiment of a processing system constructed in accordance with embodiments of the present disclosure is shown in FIG. 2 and is designated generally by reference character 100. Other embodiments of processing system 10 and/or a distributor devices in accordance with the disclosure, or aspects thereof, are provided in FIGS. 3A-8, as will be described.

The methods and systems of the present disclosure provide for distributor devices that provide improved cross-sectional coverage and distribution of riser vapor and catalyst into the reactor bed, and reduce the possibility of gas channeling and bypassing, resulting in increased catalytic conversion. Improved distribution will further result in uniformity of fluidized catalyst bed density, and improved pressure buildup. Improved vapor distribution will also lead to more uniform coke laydown on the catalyst which results in improved stripping and regeneration performance.

As shown in FIG. 2, a processing assembly 100 includes a vessel 102 defining an interior space 104 and a fluid distribution device 101 including a cylindrical riser 106 mounted in interior space 104 of vessel 102 having a first end 108 mounted to vessel 102 and a second end 110 opposite from first end 108. Processing assembly 100 can be a reactor or regenerator, e.g. processing assembly 100 is a fluidized catalyst bed reactor where product vapors and partially coked catalyst from the riser are introduced into the reactor catalyst bed and distributed using device 101 for vapors to further interact with fluidized catalyst bed and crack. In another instance, processing assembly 100 is a fluidized bed regenerator where air and spent catalyst is introduced into the regenerator fluidized catalyst bed and distributed using device 101 to burn the coke out of the spent catalyst. Device 101 includes distribution arms 120 extending radially outward from cap 112 toward an interior surface 128 of vessel 102. Riser includes elongated riser slots 154 that provide outlets for riser vapor and catalyst into the dense fluidized catalyst bed.

Figure 3A:
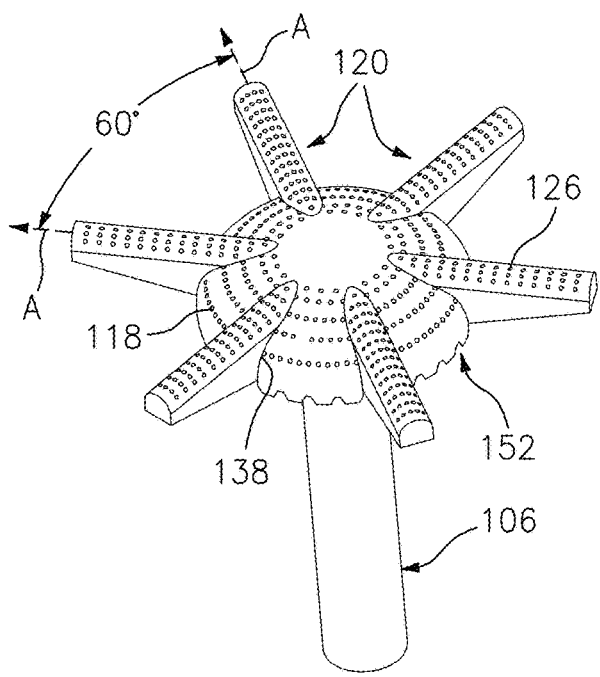
FIGS. 3A-3C are perspective views of the distribution device of FIG. 2, showing the riser and cap of the distribution device along with distribution arms extending from the cap.
Figure 3B:
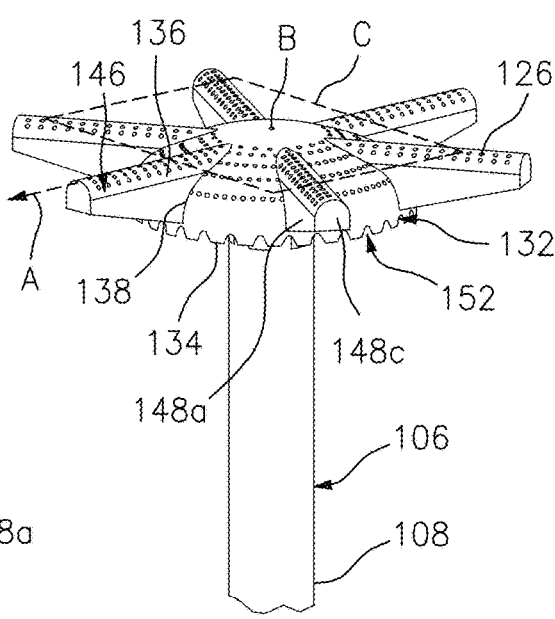
Figure 3C:
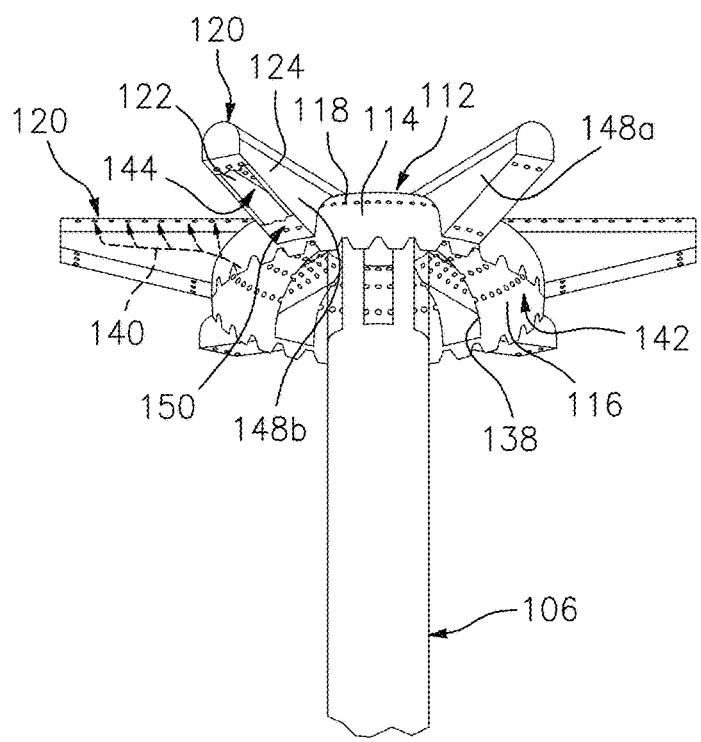

With reference now to FIGS. 3A-3C, cap 112 includes an outer surface 114 and an inner surface 116 with a plurality of holes 118 defined between inner surface 116 and outer surface 114. Each distribution arm defines an interior surface 122 and an exterior surface 124. Each distribution arm 120 includes a plurality of holes 126 between interior surface 122 and exterior surface 124. The flow through discrete holes 118 on cap 112 helps promote small bubble formation and increase gas solid contacting above cap 112, holes 126 of each distribution arm 120 provide a similar function, thereby increasing gas solid contacting as compared with traditional distributors. Increasing formation of small bubbles tends to lead to more uniform mixing of vapors into the fluidized catalyst bed, promoting further cracking of naphtha vapors from riser to liquefied petroleum gas (LPG), specifically propylene. Extending the branch arms 120 with holes from the mushroom cap 112 helps to achieve improved spread and uniformity of riser vapors into the fluidized catalyst bed, which result in less bed depth required for reaction, reducing the overall inventory. Distribution arms 120 can be supported from above by vessel wall 128, for example by a suspension cable or the like extending from a portion of vessel wall 128 above distribution arms 120. In a regenerator application, increasing formation of small bubbles results in improved spread and uniformity of combustion air and spent catalyst into the fluidized catalyst bed, which assists in achieving uniform regeneration of catalyst as well as uniform temperature profile in the regenerator vessel.

Figure 8:
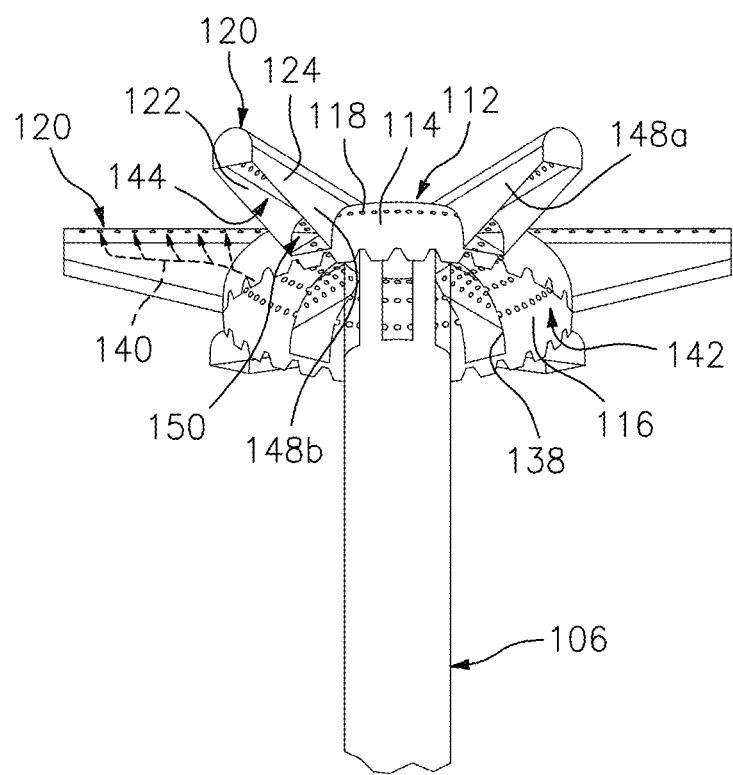
FIG. 8 is a perspective views of another embodiment of a distribution device constructed in accordance with the present disclosure, showing the distribution arms without a bottom wall.

With continued reference to FIGS. 3A-3C, cap 112 terminates in a downwardly extending skirt 132 having an edge 134, e.g. a bottom edge, facing toward first end 108 of the riser 106. Downwardly extending skirt 132 includes a plurality of weir notches 152 extending upwardly into skirt 132 from edge 134 of skirt 132. Cap 112 defines an apex point B having a plane C tangential thereto. A top surface 136 of each distribution arm defines a respective central longitudinal axis A. The longitudinal axis A of each top surface is positioned at, or substantially close to, the vertical elevation of apex point B. The longitudinal axis A of each top surface 136 is parallel to plane C. In other words, the top surface 136 is inclined at zero degrees relative to the plane C. If the arm 120 is enclosed from the bottom with a bottom wall 150 (described in more detail below), the bottom wall 150 is inclined (0 to 45°) relative to plane C to allow catalyst to slide down the bottom wall 150 and avoid catalyst sitting on the bottom wall 150. If arms 120 are not enclosed from the bottom, e.g. as shown in FIG. 8, then bottom edges of side walls 148a and 148b can be inclined or kept parallel to axis A. The device 102 of FIG. 8 is substantially the same as that of FIGS. 3A-3B, except for the removal of bottom wall 150. The Those skilled in the art will readily appreciate that, while arms 120 are shown as being formed by discrete walls 148a-148c, it is contemplated that arms 120 can be integrally and/or unitarily formed with cap 112.

With continued reference now to FIGS. 3A-3C, cap 112 includes a plurality of inwardly extending openings 138 which provide an opening in the mushroom cap 112 to an interior cavity 144 of each arm 120. Each distribution arm 120 is nested within a respective one of plurality of inwardly extending openings 138. Distribution arms 120 extend radially outward beyond edge 134 of cap 112. Distribution arms 120 are evenly spaced apart about a center of cap 112. Mushroom cap 112 includes multiple distribution arms 120. The embodiment of FIGS. 3A-3C includes six distribution arms. Those skilled in the art will readily appreciate that the number of arms can vary from 1 to 8, or higher, depending on the vessel size, geometry, presence of other internals or distribution requirements. Each distribution arm is equally spaced from an adjacent distribution arm 120 (as measured between two central longitudinal axes A). Each distribution arm 120 defines a distribution arm flow path 140 (schematically shown by the dashed arrow in FIG. 3C) from an inner surface 116 side 142 of cap 112 through the interior cavity 144 of distribution arm 120 and out through at least one of plurality of holes 126 of distribution arm 120. The extension of distribution arms 120 provides improved cross-sectional coverage of riser vapor and catalyst into the reactor bed, resulting in increased catalytic conversion. In regenerator applications, distribution arms 120 provide improved spread and uniformity of riser vapors and increased air and spent catalyst flow uniformity in the regenerator catalyst bed, resulting in uniform regeneration of catalyst and a uniform temperature profile. While described in the context of reactor and regenerator applications, those skilled in the art will readily appreciate that device 101 can be used in a variety of vessels with fluidized beds.

As shown in FIGS. 3A-3C, each distribution arm 120 is bounded by a respective top wall 146 and three side walls 148a, 148b and 148c. Top 146 and side walls 148a-148c can be integrally formed with one another. Plurality of holes 126 of each distribution arm are defined in respective top wall 146. Top 146 and side walls 148a-148b of each distribution arm are mounted to cap 112. Each side wall 148c is an end wall of its respective distribution arm 120. Each distribution arm is at least partially enclosed by the bottom wall 150 connecting between two side walls 148a. It some embodiments, however, it is contemplated that bottom wall 150 can be removed such that distribution arm 120 is open on the bottom. Outer surface 114 of cap 112 is dome shaped.

Figure 4B:
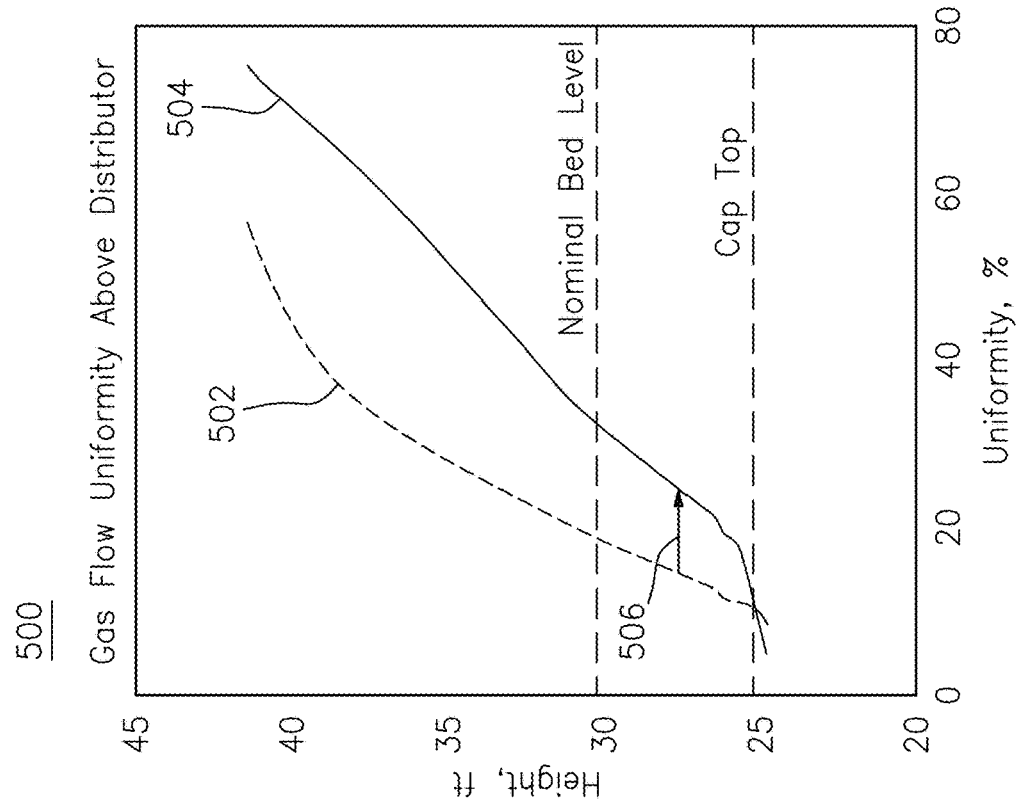
FIG. 4B is an enlarged view of a portion of the chart of FIG. 4A, schematically showing the increase in gas flow uniformity between a traditional distribution device and the distribution device of FIG. 2, for the portion above the cap top.
Figure 4A:
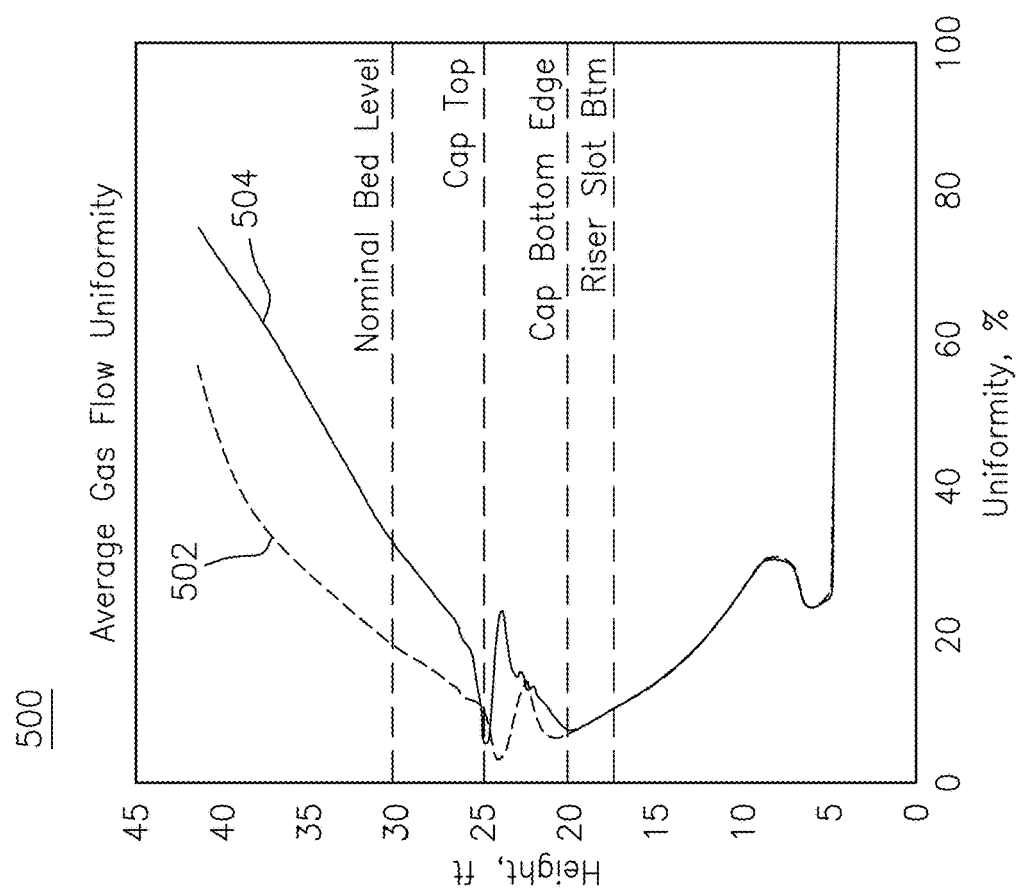
FIG. 4A is a chart representing the degree of gas flow uniformity predicted using computational fluid dynamics (CFD), with respect to the vessel height proximately to the nominal bed level, showing a comparison of average gas flow uniformity between a traditional distribution device and the distribution device of FIG. 2.

As shown in FIGS. 4A-4B, embodiments of distribution device 101 provide increased average gas flow uniformity over traditional distribution devices. Chart 500 represents an example of the time average plot of gas flow uniformity predicted using computational fluid dynamics (CFD) with respect to vessel height at the proximity to distributor top ("Cap Top") and nominal bed level. CFD simulation is widely used to model gas, solid and liquid flow dynamics, and is used to simulate the flow of vapor and catalyst in the riser, distributor and reactor catalyst bed. Chart 500 of FIG. 4A shows an example of a comparison of average flow uniformity between a traditional distribution device, e.g. device 10 (represented by line 502), and a distribution device in accordance with the present disclosure, e.g. distribution device 101 (represented by line 504) of FIG. 2. Chart 500 of FIG. 4B schematically shows that the riser vapor is more uniformly distributed (with arrow 506) when the distribution device similar to distribution device 101 is used. Arrow 506 represents a two-times increase in uniformity between device 10 and device 101. The uniformity index (e.g. "Uniformity, %" on the x-axis of FIGS. 4A and 4B) quantifies the amount of cross-sectional area actively being used for flow. Flow uniformity is defined as a ratio of cross-sectional area used for fluid flow by the total cross-sectional area. Chart 500 shows that the gas flow distribution per unit cross-sectional area of catalyst bed above the distributor improved almost by a factor of two with distribution arms.

Figure 5:
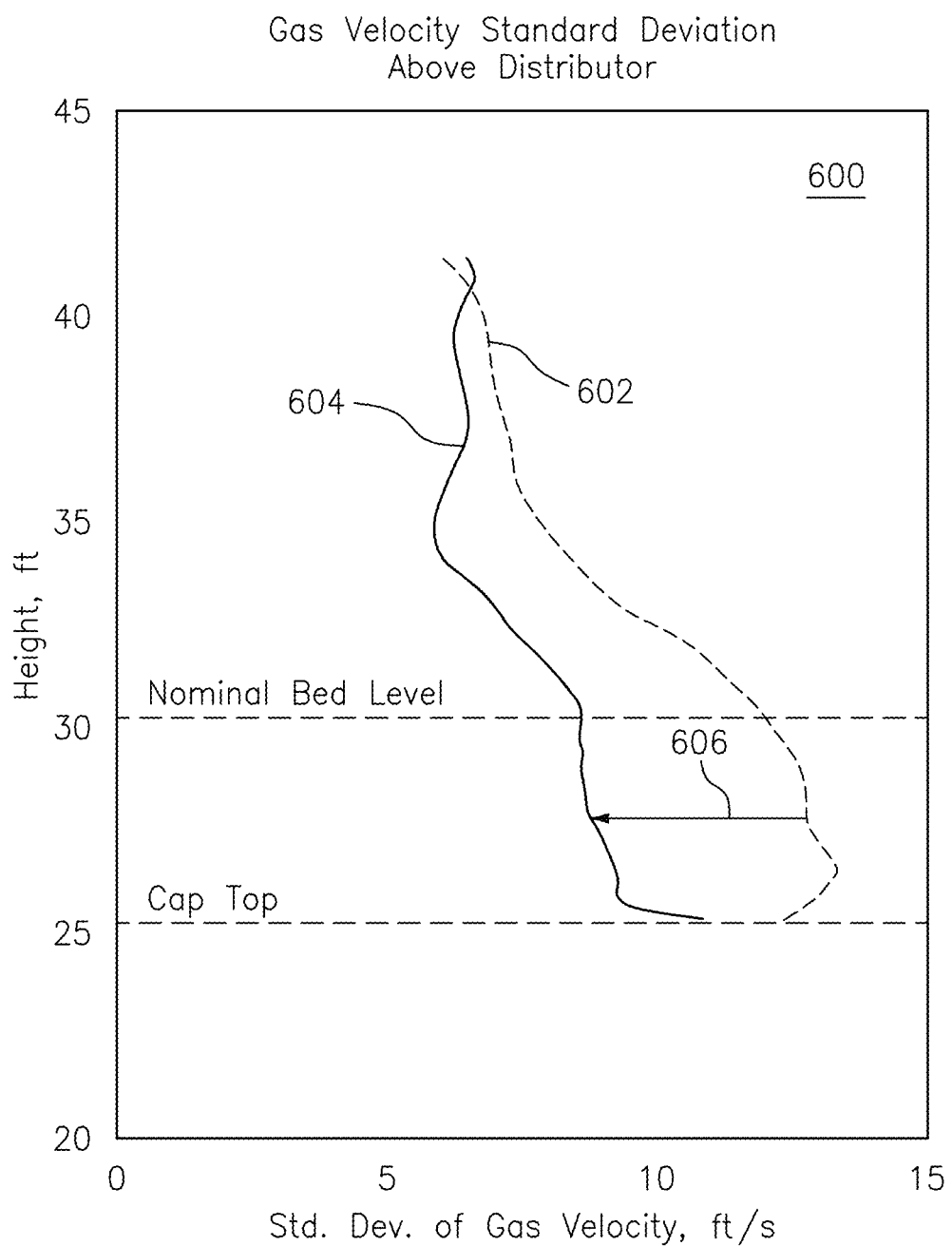
FIG. 5 is a chart depicting a performance comparison between a traditional distribution device and the distribution device of FIG. 2, based on CFD modeling results, in terms of standard deviation of axial gas velocity component in the catalyst bed above the distributor.

With reference now to FIG. 5, chart 600 represents the standard deviation of axial gas velocity component in the catalyst bed above the distributor, which determines the degree of gas streaming. Lower standard deviation relates to less variation in gas velocity, which further implies gas is more uniformly distributed providing better contact with the catalyst. Arrow 606 of chart 600 shows that the standard deviation of axial velocity component reduces by at least 20% from distribution device to normal bed level when distribution arms, e.g. distribution arms 120, are incorporated with the distributor cap. The standard deviation of an axial velocity component for a traditional distribution device, e.g. device 10, is represented by line 602 and the standard deviation of an axial velocity component for a distribution device constructed in accordance with embodiments of the present disclosure, e.g. device 101, is represented by line 604. Lower standard deviation with distribution arms indicates less gas by-passing and improved performance.

Figure 6:
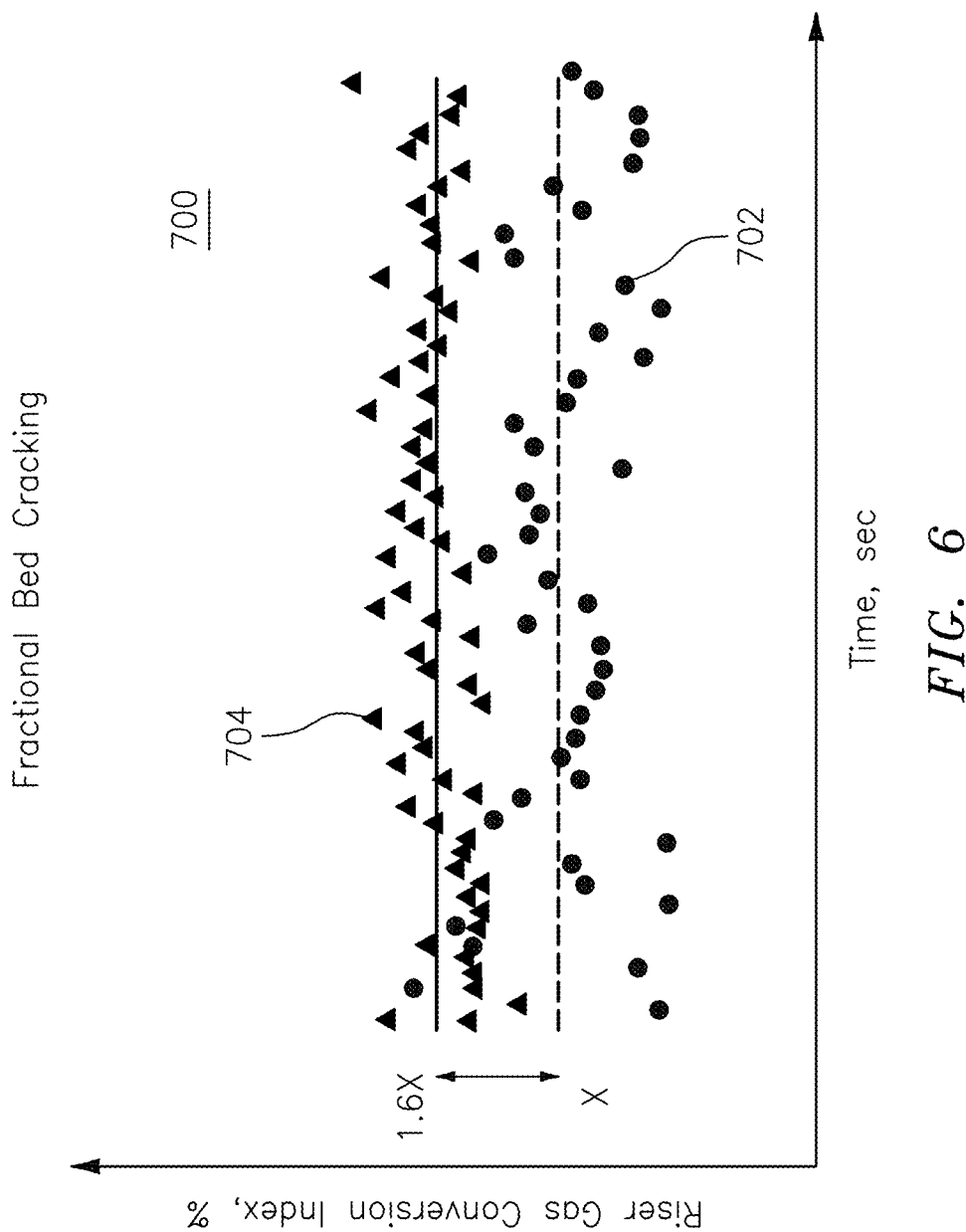
FIG. 6 is a chart depicting a comparison of the percent riser vapor cracked based on riser vapor interaction with the fluidized catalyst bed between a traditional distribution device and the distribution device of FIG. 2.

With reference now to FIG. 6, chart 700 shows a plot of the percent riser vapors are cracked based on their degree of interaction with catalyst particles in the reactor catalyst bed. The percentage that riser gas/vapors are converted (e.g. cracked) for a traditional distribution device, e.g. device 10, is shown by line 702, and the percentage that riser gas/vapors are converted (e.g. cracked) for a distribution device constructed in accordance with embodiments of the present disclosure, e.g. device 101, is shown by line 704. Chart 700 indicates that the riser gas conversion is increased by a factor of 1.6 times when distribution arms, e.g. distribution arms 120, are used, indicating good interaction of riser gas and bed catalyst contacting.

Figures 7A, 7B:
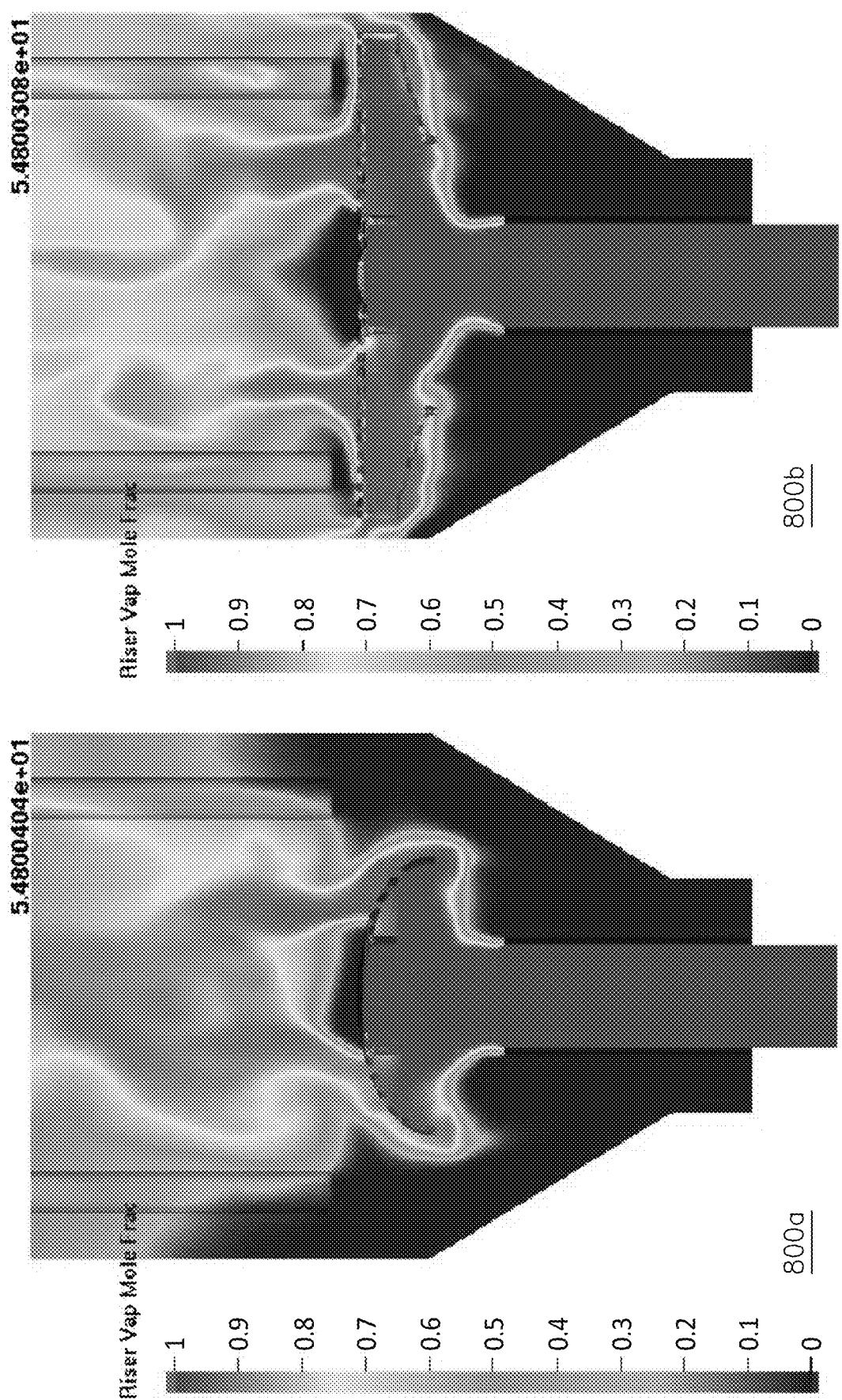
FIG. 7A is a CFD result representing an instantaneous plot of riser vapor concentration across the reactor bed as the vapor flows up the reactor for a traditional distribution device.
FIG. 7B is a CFD result representing an instantaneous plot of riser vapor concentration across the reactor bed as the vapor flows up the reactor for the distribution device of FIG. 2.

As shown by the comparison of FIGS. 7A-7B, distribution devices constructed in accordance with embodiments of the present disclosure, e.g. distribution device 101, provide improved flow distribution. FIG. 7A shows a color CFD modeling result 800a representing an instantaneous plot of riser vapor concentration across a reactor bed as the vapor flows up a reactor having a traditional distribution device, e.g. device 10. In contrast, FIG. 7B shows a color CFD modeling result 800b representing an instantaneous plot of riser vapor concentration across another reactor bed as the vapor flows up a reactor having a distribution device constructed in accordance with embodiments of the present disclosure, e.g. device 101. As shown in FIG. 7B, embodiments in accordance with the present disclosure provide for a distribution device that provides significantly improved vapor coverage and distribution as compared with traditional distribution devices. Without distribution arms, e.g. distribution arms 120, gas flows around the mushroom (e.g. cap) and has the tendency to combine with the gas flowing through the cap to form a central plume (evident by the large concentration of red in the top center portion of CFD diagram 800a). In contrast, with distribution arms 120, riser vapors are more uniformly distributed across the cross-section (evident by diagram 800b) resulting in improved cracking indicated by lower riser vapor concentration.

The methods and systems of the present disclosure provide for a multiphase fluid distribution device which includes a mushroom cap with distribution arms providing improved cross-sectional coverage of vapors and catalyst into a fluidized bed of catalyst particles. Such distributors when used in fluid catalytic cracking reactor distributes riser vapors and catalyst more evenly into the fluidized catalyst bed of the reactor resulting in increased catalytic conversion. In a FCC regenerator application, it provides increased air and spent catalyst flow uniformity in the fluidized catalyst bed resulting in uniform catalyst regeneration and temperature profile.

The methods and systems of the embodiments of the present disclosure, as described above and shown in the drawings, provide for distributor devices that provide increased flow uniformity, promote smaller bubbles to increase gas solid contacting, and reduce the possibility of gas channeling and bypassing. While the apparatus and methods of the subject invention have been shown and described with reference to preferred embodiments, those skilled in the art will readily appreciate that changes and/or modifications may be made thereto without departing from the spirit and scope of the subject invention. The above description and examples are merely illustrative of the invention and should not be construed as limiting the scope of the invention. Various modifications will become apparent to the skilled artisan in view of the foregoing disclosure. It is intended that all such modifications coming within the scope and spirit of the appended claims should be embraced thereby.

What is claimed is:

1. A fluid distribution device comprising:
 a riser having a first end and a second end;
 a cap operatively connected to the second end of the riser, wherein the cap includes an inner surface and an outer surface with a plurality of holes defined between the inner and outer surface; and
 at least one distribution arm extending radially outward from the cap, wherein the at least one distribution arm has an interior surface and an exterior surface, and wherein the at least one distribution arm includes a plurality of holes between the interior surface and the exterior surface, wherein the at least one distribution arm is bounded by a respective top wall defining a top surface, and two respective side walls, wherein the top surface defines a longitudinal axis, and wherein the at least one distribution arm is at least one of (i) partially enclosed by a bottom wall connecting between the two side walls, wherein the bottom wall is inclined relative to the longitudinal axis, or (ii) open between the two side walls opposite from the top wall.

2. The device as recited in claim 1, wherein the cap includes at least one inwardly extending opening, wherein the at least one distribution arm is nested within the at least one inwardly extending opening.

3. The device as recited in claim 1, wherein the at least one distribution arm extends radially outward beyond an edge of the cap.

4. The device as recited in claim 1, wherein the at least one distribution arm includes a plurality of distribution arms evenly spaced apart about a center of the cap.

5. The device as recited in claim 1, wherein the outer surface of the cap defines an apex, wherein a longitudinal axis of a top surface of the at least one distributor arm is positioned at the vertical elevation of the apex.

6. The device as recited in claim 1, wherein the outer surface of the cap defines an apex defining a tangential plane, wherein a longitudinal axis of a top surface of the at least one distributor arm is parallel to the tangential plane.

7. The device as recited in claim 1, wherein the at least one distribution arm defines a distribution arm flow path from an inner surface side of the cap through an interior cavity of the distribution arm and out through at least one of the plurality of holes of the distribution arm.

8. The device as recited in claim 1, wherein the plurality of holes of the at least one distribution arm are defined in the respective top wall.

9. The device as recited in claim 1, wherein the top and side walls of the at least one distribution arm are mounted to the cap.

10. The device as recited in claim 1, wherein the top and side walls of the at least one distribution arm are integrally formed.

11. The device as recited in claim 1, wherein the outer surface of the cap is dome shaped.

12. The device as recited in claim 1, wherein the exterior surface of the at least one distribution arm has an arcuate shape.

13. The device as recited in claim 1, wherein the cap terminates in a downwardly extending skirt having an edge facing toward the first end of the riser.

14. The device as recited in claim 13, wherein the downwardly extending skirt includes a plurality of weir notches extending upwardly into the skirt from the edge of the skirt.

15. The device as recited in claim 1, wherein the first end and the second end of the riser are a first inlet end and a second inlet end, wherein the cap operatively connected to the outlet end of the riser.

16. A processing assembly comprising:
a vessel defining an interior space; and
a fluid distribution device including:
a riser mounted in the interior space of the vessel having a first end mounted to the vessel and a second end opposite from the first end;
a cap operatively connected to the second end of the riser, wherein the cap includes an outer surface and an inner surface with a plurality of holes defined between the inner and outer surface; and
at least one distribution arm extending radially outward from the cap, wherein the at least one distribution arm defines an interior surface and an exterior surface, wherein the at least one distribution arm includes a plurality of holes between the interior surface and the exterior surface, wherein the at least one distribution arm is bounded by a respective top wall defining a top surface, and two respective side walls, wherein the top surface defines a longitudinal axis, and wherein the at least one distribution arm is at least one of (i) partially enclosed by a bottom wall connecting between the two side walls, wherein the bottom wall is inclined relative to the longitudinal axis, or (ii) open between the two side walls opposite from the top wall.

17. The assembly as recited in claim 16, wherein the at least one distribution arm extend radially outward from the cap toward an interior surface of the vessel.

18. The assembly as recited in claim 16, wherein the processing assembly is a fluidized catalyst bed reactor.

19. The assembly as recited in claim 16, wherein the processing assembly is a fluidized bed regenerator.

20. The assembly as recited in claim 16, wherein the vessel includes an opening for receiving the first end of the riser.

* * * * *